(12) United States Patent
Sharma et al.

(10) Patent No.: US 11,995,753 B2
(45) Date of Patent: May 28, 2024

(54) GENERATING AN AVATAR USING A VIRTUAL REALITY HEADSET

(71) Applicant: Charter Communications Operating, LLC, St. Louis, MO (US)

(72) Inventors: Komal Sharma, Lakewood, CO (US); Muhammad Khan, Greenwood Village, CO (US); Hany Heikal, Aurora, CO (US); Mohamed Daoud, Englewood, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 23 days.

(21) Appl. No.: 17/863,176

(22) Filed: Jul. 12, 2022

(65) Prior Publication Data
US 2024/0020900 A1    Jan. 18, 2024

(51) Int. Cl.
| | |
|---|---|
| *G06T 13/40* | (2011.01) |
| *G02B 5/08* | (2006.01) |
| *G02B 27/00* | (2006.01) |
| *G02B 27/01* | (2006.01) |
| *G06F 3/01* | (2006.01) |
| *G06T 3/4038* | (2024.01) |
| *G06T 11/60* | (2006.01) |
| *G06T 19/00* | (2011.01) |

(52) U.S. Cl.
CPC ............. *G06T 13/40* (2013.01); *G02B 5/08* (2013.01); *G02B 27/0093* (2013.01); *G02B 27/0101* (2013.01); *G02B 27/017* (2013.01); *G02B 27/0179* (2013.01); *G06F 3/013* (2013.01); *G06T 3/4038* (2013.01); *G06T 11/60* (2013.01); *G06T 19/006* (2013.01); *G02B 2027/0138* (2013.01); *G02B 2027/014* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 10,664,903 B1 * | 5/2020 | Haitani | G02B 27/017 |
| 2012/0287255 A1 * | 11/2012 | Ignatovich | A61B 3/1208 |
| | | | 348/78 |
| 2014/0341441 A1 * | 11/2014 | Slaby | G06V 40/193 |
| | | | 382/117 |
| 2019/0371028 A1 * | 12/2019 | Harrises | G06V 20/20 |
| 2021/0319621 A1 * | 10/2021 | Qiao | G06T 19/20 |

OTHER PUBLICATIONS

Saito, Shunsuke, et al., "Photorealistic Facial Texture Inference Using Deep Neural Networks," Computer Vision and Pattern Recognition, arXiv:1612.00523, Dec. 2, 2016, 14 pages.
Popper, Ben, "This tech generates realistic avatars from a single selfie," The Verge, www.theverge.com/2016/12/13/13919766/loomai-vr-avatar-digital-character-3d-visual-effect, Dec. 13, 2016, 4 pages.

\* cited by examiner

*Primary Examiner* — Jwalant Amin
(74) *Attorney, Agent, or Firm* — Dority & Manning, P.A.

(57) ABSTRACT

A camera of a virtual reality (VR) headset captures a plurality of images of a reflection of a user in a mirror. The plurality of images include at least a first image of a reflection of the user in a first position with respect to the mirror and a second image of a reflection of the user in a second position with respect to the mirror. A three-dimensional avatar is generated based on the plurality of images captured by the camera.

19 Claims, 8 Drawing Sheets

GENERATING AN AVATAR USING A VIRTUAL REALITY HEADSET

BACKGROUND

An avatar is a digital representation of a user. That is, the avatar is the user's physical form in the digital world. The avatar may be a realistic representation of the user, having similar physical features as the user, or the avatar may be a fantastical representation of the user, having fictional characteristics (e.g., the avatar may be in the form of an animal, superhero, alien, etc.). In the context of gaming, avatars make it easier for a user to feel like they are inside the game, and lead to more excitement and positive emotions during gameplay. Avatars may also be used in connection with social media applications, online communities, and websites.

SUMMARY

The disclosure relates generally to generating a three-dimensional (3D) digital avatar using a virtual reality headset (which may also be referred to as virtual reality goggles, head-mounted displays, or virtual reality glasses). More particularly, the disclosure relates to generating the 3D digital avatar using the virtual reality headset based on images of a reflection of a user which are captured by one or more cameras of the virtual reality headset.

According to an example of the disclosure a method for generating a three-dimensional avatar includes capturing, by at least one camera of a virtual reality (VR) headset, a plurality of images of a reflection of a user in a mirror, wherein the plurality of images include at least a first image of a reflection of the user in a first position with respect to the mirror and a second image of a reflection of the user in a second position with respect to the mirror, and generating a three-dimensional avatar based on the plurality of images captured by the at least one camera.

In some implementations, the at least one camera includes at least one rearward-facing camera, and capturing the plurality of images of the reflection of the user in the mirror includes capturing, by the at least one rearward-facing camera, a third image of a reflection of the user in a third position with respect to the mirror, the reflection of the user in the third position including a reflection of a back of the user, and generating the three-dimensional avatar is further based on the third image captured by the at least one rearward-facing camera.

In some implementations, the three-dimensional avatar is a three-dimensional avatar of an entire body of the user.

In some implementations, capturing, by the at least one camera, the plurality of images of the reflection of the user in the mirror, further includes capturing the plurality of images while the VR headset is worn by the user.

In some implementations, capturing, by the at least one camera, the plurality of images of the reflection of the user in the mirror, further includes: capturing the first image while the VR headset is worn by the user and capturing the second image while the VR headset is held by the user, the second image including a reflection of eyes of the user.

In some implementations, the at least one camera includes at least one interior camera configured to capture at least a portion of a face of the user, and the method further includes capturing, by the at least one interior camera, at least one image of a face of the user while the VR headset is worn by the user, and generating the three-dimensional avatar is further based on the at least one image of the face of the user captured by the at least one interior camera.

In some implementations, the method further includes tracking a gaze of the user using the at least one interior camera.

In some implementations, the first image depicts a frontal view of the user, and the second image depicts a side view of the user.

In some implementations, generating the three-dimensional avatar based on the plurality of images captured by the at least one camera further includes stitching the plurality of images together.

In some implementations, stitching the plurality of images together includes: obtaining depth estimates from two or more of the plurality of images and creating a three-dimensional mesh from the plurality of images based on the depth estimates.

In some implementations, the method further includes automatically providing the three-dimensional avatar to a VR platform or a VR application subsequent to generating the three-dimensional avatar, and providing, for presentation on a display device of the VR headset, the three-dimensional avatar in a virtual world while the VR application is executed.

In some implementations, the method further includes receiving, via an input device associated with the VR headset, a request to generate the three-dimensional avatar, and subsequent to receiving the request, providing guidance to the user using an output device of the VR headset to direct the user to change positions from the first position to the second position after the first image is captured by the at least one camera.

In some implementations, the at least one camera includes at least one rearward-facing camera, and the method further includes: after the second image is captured by the at least one camera, providing guidance to the user using the output device to direct the user to change positions from the second position to a third position in which a back of the user faces the mirror. After the user is in the third position, the method further includes causing the at least one rearward-facing camera to capture a third image of a reflection of the user, the reflection of the user in the third position including a reflection of the back of the user, and generating the three-dimensional avatar is further based on the third image captured by the at least one rearward-facing camera.

In some implementations, the method further includes providing guidance to the user using an output device of the VR headset to direct the user to take off the VR headset and to hold the VR headset such that the VR headset faces the mirror while the user also faces the mirror. While the VR headset is held such that the VR headset faces the mirror while the user also faces the mirror, the method further includes causing the at least one camera to capture a third image of a reflection of the user, the third image including a reflection of eyes of the user, and generating the three-dimensional avatar is further based on the third image captured by the at least one camera.

According to an example of the disclosure, a virtual reality (VR) headset, includes: at least one camera configured to capture a plurality of images of a reflection of a user in a mirror, wherein the plurality of images include at least a first image of a reflection of the user in a first position with respect to the mirror and a second image of a reflection of the user in a second position with respect to the mirror, at least one memory configured to store instructions, and at least one processor configured to execute the instructions stored in the at least one memory to generate a three-dimensional avatar based on the plurality of images captured by the at least one camera.

In some implementations, the at least one camera includes at least one rearward-facing camera. The at least one rearward-facing camera is configured to capture a third image of a reflection of the user in a third position with respect to the mirror, the reflection of the user in the third position including a reflection of a back of the user, and the at least one processor is configured to generate the three-dimensional avatar based on the third image captured by the at least one rearward-facing camera.

In some implementations, the at least one camera includes at least one interior camera. The at least one interior camera is configured to capture at least one image of a face of the user while the VR headset is worn by the user, and the at least one processor is configured to generate the three-dimensional avatar based on the at least one image of the face of the user captured by the at least one interior camera.

In some implementations, the VR headset further includes a display device. The at least one processor is configured to automatically provide the three-dimensional avatar to a VR platform or a VR application subsequent to generating the three-dimensional avatar, and the at least one processor is configured to provide, for presentation on the display device, the three-dimensional avatar in a virtual world while the VR application is executed.

In some implementations, the VR headset further includes an input device configured to receive an instruction to generate the three-dimensional avatar and an output device configured to, subsequent to receiving the instruction, provide guidance to the user to direct the user to change positions from the first position to the second position after the first image is captured by the at least one camera.

In some implementations, the VR headset is configured to cause the at least one processor of the VR headset to implement any of the operations of the methods disclosed herein.

According to an example of the disclosure, a non-transitory computer-readable storage medium includes executable instructions configured to cause one or more processor devices of a virtual reality (VR) headset to: capture, by at least one camera of the VR headset, a plurality of images of a reflection of a user in a mirror, wherein the plurality of images include at least a first image of a reflection of the user in a first position with respect to the mirror and a second image of a reflection of the user in a second position with respect to the mirror, and generate a three-dimensional avatar based on the plurality of images captured by the at least one camera.

In some implementations, the non-transitory computer-readable storage medium includes executable instructions configured to cause one or more processor devices of the VR headset to implement any of the operations of the methods disclosed herein.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
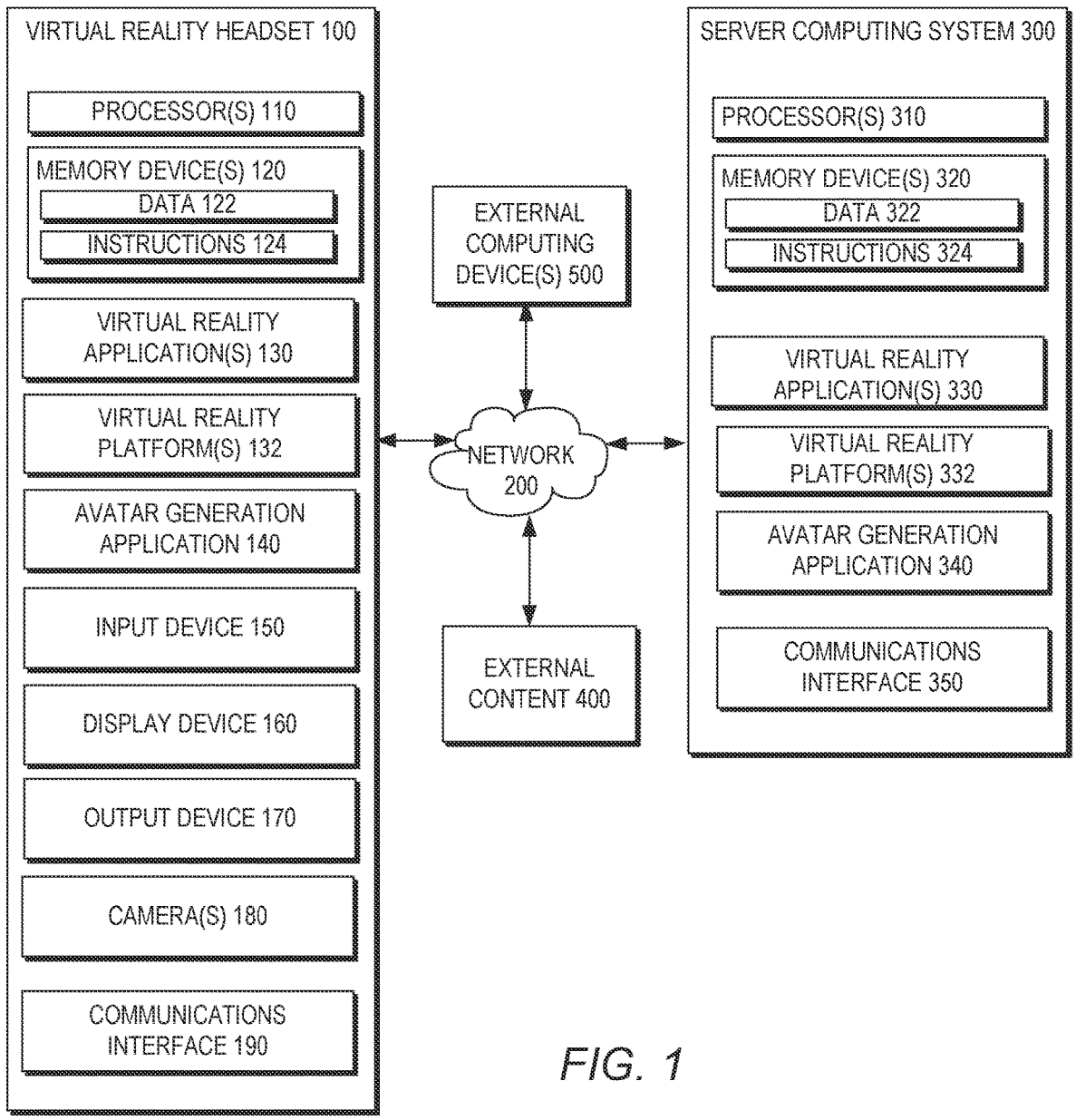
FIG. 1 is an example block diagram of an environment suitable for generating an avatar using a virtual reality headset, according to some implementations of the disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of operations. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1)

at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Users may create avatars using various applications. A user can create a personalized avatar using two-dimensional (2D) images or build the avatar from templates. Avatars can be further customized by adjusting various attributes provided in an application (e.g., by selecting a hair style, hair color, eye shape, eye color, etc.). Avatars can be represented in 2D or three-dimensional (3D) forms. However, it may be difficult or cumbersome to create an avatar which realistically represents an entire body of a user. In particular, it may be difficult or cumbersome to create a 3D avatar which realistically represents the entire body of the user.

According to one or more examples disclosed herein, a realistic human-like 3D avatar may be generated in full color and have an optimal size. For example, according to one or more examples disclosed herein a virtual reality (VR) headset includes one or more cameras which are configured to scan a mirror reflection of a user to create a 3D avatar. The 3D avatar is a mirrored 3D image of at least a portion of the user which provides the perception of height, width, and depth and can realistically represent how the user appears in real life. The 3D avatar can be used to simulate user movements in real-time in a virtual world. This will not only enhance the user experience but also bring the user closer to their digital form.

In some implementations, the VR headset may include a plurality of cameras (e.g., four built-in cameras) to capture the reflection of the user in the mirror to create a 3D avatar in real-time. For example, the plurality of cameras may be configured to scan the reflected image on the mirror. For example, the mirror may be a full-length mirror so that an entire body of the user may be more easily captured by the plurality of cameras.

According to some examples of the disclosure, a 3D avatar may be generated using a VR headset according to the following example process. First, while the user is wearing the VR headset the user stands in front of a mirror (e.g., a full-length mirror) such that a reflection of the entire body of the user (e.g., a frontal view) is shown in the mirror. One or more cameras included in the VR headset capture the reflection of the user in the mirror to obtain a front profile of the user (e.g., from head to toe).

Second, the user (while still standing in front of the mirror and wearing the VR headset) rotates (e.g., 90 degrees to the left or right) such that the body of the user faces in a first direction perpendicular to the mirror and a reflection of a second side of the body of the user (e.g., a second side view) is shown in the mirror. The head of the user is turned to face the mirror and one or more cameras included in the VR headset capture the reflection of the second side of the user in the mirror to obtain a second side profile of the user.

Next, the user (while still standing in front of the mirror and wearing the VR headset) rotates (e.g., 180 degrees) such that the body of the user faces in a second direction perpendicular to the mirror and a reflection of a first side of the body of the user (e.g., a first side view) is shown in the mirror. The head of the user is turned to face the mirror and one or more cameras included in the VR headset capture the reflection of the first side of the user in the mirror to obtain a first side profile of the user.

In some implementations, the user (while still standing in front of the mirror and wearing the VR headset) rotates such that the body of the user faces in a direction opposite of the mirror and a reflection of a rear or back side of the body of the user (e.g., a rear view) is shown in the mirror. In some implementations, one or more cameras included in the VR headset are capable of facing rearward (e.g., by rotating) or are mounted so as to face in a rearward direction and capture the reflection of the rear side of the user in the mirror to obtain a rear profile of the user.

The profile images which are captured may be stored in one or more memories of the VR headset and/or in one or more memories of a server computing system. Once all profile images are captured, the images are processed via photogrammetry technology to generate a full body 3D avatar. The photogrammetry technology, which may be implemented by the virtual reality headset, a server computing system, or a combination thereof, generates the 3D avatar based on the captured images. The process for generating the 3D avatar may include processing the captured images (which are 2D images) using an algorithm and stitching the 2D images together. Depth estimates may be obtained from a plurality of the 2D images to create a 3D mesh from the 2D images to generate the full body 3D avatar.

The full body 3D avatar generated using the VR headset via the above process can be used in any number of applications like VR games, virtual worlds, metaverse applications, etc. For example, the 3D avatar may be automatically provided to a VR platform or a VR application subsequent to generating the 3D avatar (e.g., by the VR headset transmitting the 3D avatar over a network to a VR platform or a VR application which may be provided to an external computing device). For example, the 3D avatar may be provided to an external computing device such as a smartphone, laptop computer, desktop computer, and the like. In some implementations, the generated 3D avatar may be presented on a display device of the virtual reality headset (e.g., in a virtual world of a VR application) so that the user can view the generated 3D avatar while wearing the VR headset.

In some implementations, some of the profiles of the user (e.g., the rear profile and/or one of the side profiles) may not be captured to generate the 3D avatar. For example, a generic rear profile may be utilized for generating the 3D avatar or one of the side profiles may be utilized to generate the other side profile via symmetry.

According to some examples of the disclosure, a 3D avatar may be generated using a VR headset according to another example process. First, while the user is wearing the virtual reality headset the user stands in front of a mirror (e.g., a full-length mirror) such that a reflection of the entire body of the user (e.g., a frontal view) is shown in the mirror. One or more cameras included in the VR headset capture the reflection of the user in the mirror to obtain a front profile of the user.

Second, the user (while still standing in front of the mirror and wearing the VR headset) rotates (e.g., 15 degrees to 30 degrees to the left or right) such that the body of the user faces in a direction oblique to the mirror and a reflection of a first angular side of the body of the user (e.g., a first angular view) is shown in the mirror. The head of the user may be turned to face the mirror and one or more cameras included in the VR headset capture the reflection of the first angular side of the user in the mirror to obtain a first angular side profile of the user. In some implementations, one or more of the cameras included in the VR headset may be mounted at an angle corresponding to the angle by which the user has rotated so that the user need not turn their head to face the mirror. In some implementations, the one or more cameras included in the VR headset may be configured to rotate to face the mirror as the user rotates to capture the reflection of the first angular side of the user in the mirror to obtain the first angular side profile of the user.

Next, the user (while still standing in front of the mirror and wearing the VR headset) rotates again (e.g., in the same 15 degree to 30 degree increment in the same direction as the prior movement) such that the body of the user faces in a direction oblique to the mirror and a reflection of a second angular side of the body of the user (e.g., a second angular view) is shown in the mirror. The head of the user may be turned to face the mirror and one or more cameras included in the VR headset capture the reflection of the second angular side of the user in the mirror to obtain a second angular side profile of the user.

The user may continue to rotate in the same 15 degree to 30 degree increments in the same direction as the prior movement and additional images can be captured of the reflection of the user in the mirror at various profiles until the user has rotated a complete 360 degrees and images of reflections of the user are captured from all directions. In some implementations, the one or more cameras included in the VR headset may be configured to rotate to face the mirror as the user rotates to capture the reflection of the user in the mirror to obtain captures of various image profiles of the user. In some implementations, a plurality of cameras included in the VR headset are mounted so as to face in different directions so that respective cameras can capture the reflection of the user in the mirror as the user rotates and various image profiles of the user can be captured from all directions.

In some implementations the above process can be repeated a plurality of times (e.g., two to four times). In some implementations one or more of the repetitions may include the user having different social expressions (e.g., different emotional expressions such as the user smiling, the user making a sad face, the user being excited, etc.) and/or making different physical expressions (e.g., the user raising their arms, the user making various gestures with their hands, the user kicking their legs, etc.). Repeating the above process with additional profile captures and additional profile captures with the user having various expressions can ensure that enough samples are provided to generate an avatar that is as lifelike as possible.

The profile images which are captured may be stored in one or more memories of the VR headset and/or in one or more memories of a server computing system. Once all profile images are captured, the images are processed via photogrammetry technology to generate a full body 3D avatar. The photogrammetry technology, which may be implemented by the VR headset, a server computing system, or a combination thereof, generates the 3D avatar based on the captured images. The process for generating the 3D avatar may include processing the captured images (which are 2D images) using an algorithm and stitching the 2D images together. Depth estimates may be obtained from a plurality of the 2D images to create a 3D mesh from the 2D images to generate the full body 3D avatar.

The full body 3D avatar generated using the VR headset via the above process can be used in any number of applications like VR games, virtual worlds, metaverse applications, etc. For example, the 3D avatar may be automatically provided to a VR platform or a VR application subsequent to generating the 3D avatar (e.g., by the VR headset transmitting the 3D avatar over a network to a VR platform or a VR application which may be provided to an external computing device). For example, the 3D avatar may be provided to an external computing device such as a smartphone, laptop computer, desktop computer, and the like. In some implementations, the generated 3D avatar may be presented on a display device of the virtual reality headset (e.g., in a virtual world of a VR application) so that the user can view the generated 3D avatar.

In some implementations, some of the profiles of the user (e.g., the rear profile and/or one of the side profiles) may not be captured to generate the 3D avatar. For example, a generic rear profile may be utilized for generating the 3D avatar or one of the side profiles may be utilized to generate another side profile via symmetry.

In some implementations, the VR headset includes one or more built-in interior cameras which are configured to track the eyes of a user wearing the VR headset. The one or more built-in interior cameras may also be configured to capture an image of a face of the user. Images of the user's face captured by the one or more built-in interior cameras can be used together with the other images of the reflection of the user to generate the 3D avatar.

In some implementations, the process for generating a 3D avatar may include the user removing the VR headset from their head and holding the VR headset in a manner so that a reflection of the user's face can be captured in the mirror. Images of the reflection of the user's face in the mirror obtained while the VR headset is held by the user can be used together with the other images of the reflection of the user to generate the 3D avatar.

In some implementations, the VR headset may include an output device (e.g., a speaker, a display device, and the like) to provide guidance to the user for generating the 3D avatar. For example, the output device may provide instructions directing the user to change positions so that various profiles of the user can be captured by the one or more cameras of the VR headset. For example, the output device may provide instructions directing the user to remove the VR headset so that one or more images of the user's face can be captured by the one or more cameras of the VR headset.

In some implementations, instead of, or in addition to, images of the user's face being captured by the VR headset, an avatar generation application may include an option for the user to select various facial features such as facial shape, facial hair, an eye shape, eye color, and other attributes from a predefined palette. The avatar generation application may include an option for the user to customize other features of the generated 3D avatar such as hair color, hairstyle, clothing, accessories, shoes, and the like. Furthermore, the avatar generation application may include an option for the user to adjust the generated 3D avatar's height, build, skin tone, and the like, according to a preference of the user. Features for modifying the 3D avatar may be stored in one or more memories of the virtual reality headset and/or may be obtained externally.

In some implementations, the method for generating the 3D avatar may include an option for the user to generate a full-body 3D avatar or a partial body 3D avatar (e.g., from the waist up).

In some implementations, the VR headset may be used by the user to capture images of other entities (e.g., animals and objects like computers, furniture, vehicles, etc.) to create digital representations of those other entities. The user may provide initial source information to the avatar generation application concerning the entity to be scanned using the one or more cameras of the VR headset. In some instances, the entity may be placed in front of a mirror and images of reflections of the entity in various profiles may be captured using the VR headset to generate the 3D avatar of the entity. In some instances, the images may be captured while the VR headset is worn by the user and/or while the user holds the VR headset.

The VR headset and methods for generating a 3D avatar disclosed herein provide a number of technical effects and benefits. In one example, the disclosure provides a way for users to easily generate a realistic 3D avatar which can replicate an entire body structure of the user using a VR headset. For example, existing cameras of the VR headset may be used to generate the 3D avatar so that additional modifications or cameras are not needed. For example, images of a reflection of the user in the mirror may be used to generate the 3D avatar so that a user can obtain a 3D avatar without needing the assistance of others. Therefore, user convenience and an experience of the user is improved because the user is not discouraged by the complexity or cumbersome process of obtaining a 3D full-body avatar. Furthermore, the generated 3D full-body avatar itself is improved as it is more realistic and similar to the user.

Reference now will be made to examples of the disclosure, one or more examples of which are illustrated in the drawings, wherein like reference characters denote like elements. Each example is provided by way of explanation of the disclosure and is not intended to limit the disclosure.

FIG. 1 is an example block diagram of an environment suitable for generating an avatar using a virtual reality headset, according to some implementations of the disclosure. In FIG. 1, the environment includes a virtual reality (VR) headset 100, a server computing system 300, external content 400, and one or more external computing devices 500, which are connected to one another over a network 200.

The VR headset 100 may be a device that is worn on the head of a user to view virtual content which is presented on a display device of the VR headset 100. The VR headset 100 may also be referred to as virtual reality goggles, head-mounted displays, or virtual reality glasses, for example.

The server computing system 300 can include a server, or a combination of servers (e.g., a web server, application server, etc.) in communication with one another, for example in a distributed fashion.

External content 400 can be any form of external content including news articles, webpages, video files, audio files, image files, written descriptions, ratings, game content, social media content, photographs, commercial offers, transportation methods, weather conditions, or other suitable external content. The VR headset 100 and server computing system 300 can access external content 400 over network 200. For example, the VR headset 100 and server computing system 300 may access external content 400 to obtain content for generating an avatar, such as customizable features for modifying the generated 3D avatar (e.g., facial features, accessories, clothing, etc.). For example, the VR headset 100 and server computing system 300 may access external content 400 to download or access a virtual reality application or virtual reality platform.

External computing device 500 can include any of a personal computer, a smartphone, a laptop, a tablet computer, and the like. For example, in some implementations the 3D avatar generated by the VR headset 100 or server computing system 300 may be provided to the external computing device 500 so that the 3D avatar may be utilized in connection with applications provided on the external computing device 500.

For example, the network 200 may include any type of communications network such as a local area network (LAN), wireless local area network (WLAN), wide area network (WAN), personal area network (PAN), virtual private network (VPN), or the like. For example, wireless communication between elements of the examples described herein may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the examples described herein may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

The VR headset 100 may include one or more processors 110, one or more memory devices 120, one or more VR applications 130, one or more VR platforms 132, an avatar generation application 140, an input device 150, a display device 160, an output device 170, one or more cameras 180, and a communications interface 190. Each of the features of the VR headset 100 may be operatively connected with one another via a system bus. For example, the system bus may be any of several types of bus structures that may further interconnect to a memory bus (with or without a memory controller), a peripheral bus, and/or a local bus using any of a variety of commercially available bus architectures. The server computing system 300 may include one or more processors 310, one or more memory devices 320, one or more VR applications 330, one or more VR platforms 332, an avatar generation application 340, and a communications interface 350. Each of the features of the server computing system 300 may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

For example, the one or more processors 110, 310 can be any suitable processing device that can be included in a VR headset 100 or server computing system 300. For example, such a processor 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), an internal or external hard disk drive (HDD), floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions, that when executed, cause the one or more processors 110 to generate a 3D avatar via the avatar generation application 140 using a plurality of images captured by the one or more cameras 180, as described according to examples of the disclosure. For example, the one or more memory devices 120 can store instructions, that when executed, cause the one or more processors 110 to transmit a plurality of images captured by the one or more cameras 180 to the server computing system 300 and to receive a 3D avatar generated via the avatar generation application 340, as described according to examples of the disclosure. For example, the one or more memory devices 320 can store instructions, that when executed, cause the one or more processors 310 to receive a plurality of images captured by the one or more cameras 180 of the VR headset 100, to generate a 3D avatar via the avatar generation application 340 using the plurality of images, and to transmit the 3D avatar to the VR headset 100, as described according to examples of the disclosure.

The one or more memory devices 120 can also include data 122 and instructions 124 that can be retrieved, manipulated, created, or stored by the one or more processor(s) 110. In some examples, such data can be accessed and used as input to generate a 3D avatar via the avatar generation application 140 using a plurality of images captured by the one or more cameras 180, as described according to examples of the disclosure. In some examples, such data can be accessed and used as input to transmit a plurality of images captured by the one or more cameras 180 to the server computing system 300 and to receive a 3D avatar generated via the avatar generation application 340, as described according to examples of the disclosure. The one or more memory devices 320 can also include data 322 and instructions 324 that can be retrieved, manipulated, created, or stored by the one or more processors 310. In some examples, such data can be accessed and used as input to receive a plurality of images captured by the one or more cameras 180 of the VR headset 100, to generate a 3D avatar via the avatar generation application 340 using the plurality of images, and to transmit the 3D avatar to the VR headset 100, as described according to examples of the disclosure.

The one or more VR applications 130, 330 can include any VR application which allows or is capable of allowing a user to implement an avatar (e.g., a 3D avatar) as a VR character in a computer-generated virtual environment which may include scenes and objects that appear to be real, making the user feel they are immersed in their surroundings. For example, the VR application may be related to gaming, social media, medicine, vehicles, military and space applications, etc.

The one or more VR platforms 132, 332 can include any VR platform which hosts or provides VR applications to the VR headset 100 or server computing system 300.

The avatar generation applications 140, 340 are each configured to generate a 3D avatar and will be discussed in more detail below. In some implementations, the VR headset 100 may generate the 3D avatar using the avatar generation application 140 without interacting with the server computing system 300. In some implementations, the VR headset 100 may provide images captured using the one or more cameras 180 to the server computing system 300, the avatar generation application 340 may generate the 3D avatar using the images captured by the one or more cameras 180, and the server computing system 300 may provide the generated 3D avatar to the VR headset 100.

The VR headset 100 may include an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, and so on. The input device 150 may be integrated with the VR headset 100 or may be communicatively coupled to the VR headset 100. For example, a user may hold a remote controller having buttons, switches, a keyboard, etc., to provide an input for executing a function of the VR headset 100, where the input may be transmitted from the remote controller to the VR headset 100 in a wired or wireless manner. The input device 150 may also be embodied by a touch-sensitive display device having a touchscreen capability, for example. The input device 150 may be used by a user of the VR headset 100 to provide an input to request to generate a 3D avatar, to provide an input to control the one or more cameras 180 to capture an image, to provide an input to execute a VR application 130, to provide an input indicating or confirming that the user is in a specific position for capturing an image of the user during a process to generate the 3D avatar, etc. For example, the input may be a voice input, a touch input, a gesture input, a click via a mouse or remote controller, and so on. In some implementations, a user may actively provide an input to the VR headset 100 to request that the VR headset 100 (or a VR application 130) generate a 3D avatar.

The VR headset 100 includes a display device 160 which presents information viewable by the user, for example on a user interface (e.g., a graphical user interface). For example, the display device 160 may be a non-touch sensitive display. The display device 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example display devices and may include other types of display devices.

The VR headset 100 includes an output device 170 configured to provide an output to the user and may include, for example, one or more of an audio device (e.g., one or more speakers), a haptic device to provide haptic feedback to a user, a light source (e.g., one or more light sources such as LEDs which provide visual feedback to a user), and the like. For example, in some implementations of the disclosure the user may be guided through a process for generating the 3D avatar. The output device 170 may provide various indications to inform, alert, or notify the user to perform a certain action as part of the process for generating the 3D avatar. For example, in some implementations of the disclosure the user may be directed to turn a certain direction via a message played by a speaker and/or by a visual indication presented on the display device 160. For example, the haptic device may be activated to alert the user that an image of the user is about to be captured by the one or more cameras 180, or to prompt the user to perform a certain action as part of the process for generating the 3D avatar. For example, in some implementations of the disclosure the user may be notified or alerted to perform a certain action as part of the process for generating the 3D avatar via a combination of one or more a speaker, haptic device, and light source.

The VR headset 100 includes one or more cameras 180. For example, the one or more cameras 180 may include an imaging sensor (e.g., a complementary metal-oxide-semiconductor (CMOS) or charge-coupled device (CCD)) to capture, detect, or recognize a user's behavior, figure, expression, etc. In some implementations, the VR headset 100 may include a plurality of cameras 180. For example, the VR headset 100 may include four cameras 180 which are mounted externally on the VR headset 100. However, the VR headset 100 may include less than four cameras (e.g., one, two, or three cameras) or more than four cameras. In some implementations, the externally mounted cameras 180 may be oriented at different angles with respect to one another (e.g., a forward direction, a rearward direction, an oblique direction, etc.) so that images from different directions can be captured by the cameras 180. In some implementations, the VR headset 100 may include built-in interior cameras configured to capture an image of a face of the user when the VR headset 100 is worn by the user. Images of the user's face captured by the one or more built-in interior cameras can be used together with the other images of the user captured by one or more externally mounted cameras, to generate the 3D avatar.

Communications interfaces 190, 350 may include any communications interfaces suitable for communicating via the network 200 as appropriate or desired. For example, the communications interfaces 190, 350 may include a network interface card.

Figure 2:
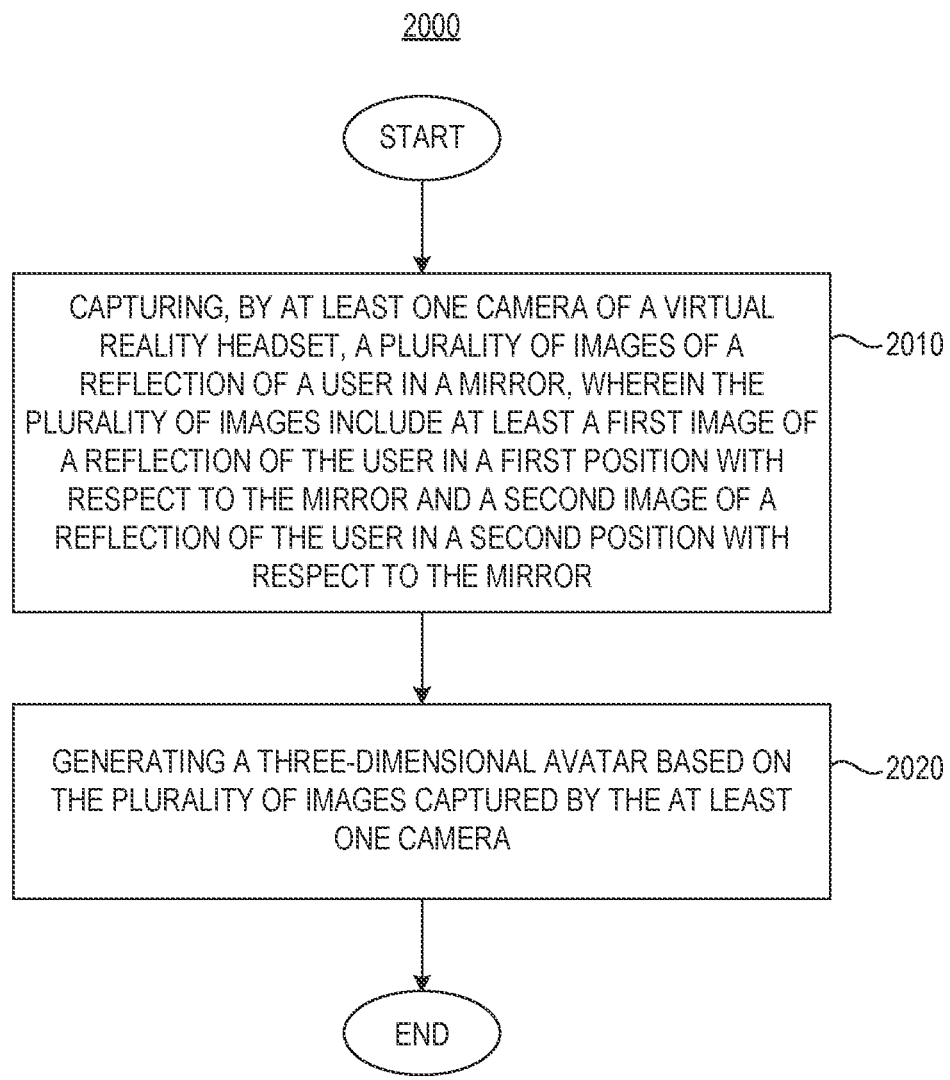
FIG. 2 is an example method for generating an avatar using a virtual reality headset, according to some implementations of the disclosure.

Referring to FIG. 2, in an example computer implemented method 2000 at operation 2010 the method includes capturing, by at least one camera of a virtual reality headset, a plurality of images of a reflection of a user in a mirror, wherein the plurality of images include at least a first image of a reflection of the user in a first position with respect to the mirror and a second image of a reflection of the user in a second position with respect to the mirror. For example, one or more cameras 180 of the VR headset 100 may capture the plurality of images of the reflection of the user in the mirror. At operation 2020 the method includes generating a three-dimensional avatar based on the plurality of images captured by the at least one camera. In some implementations, the avatar generation application 140 generates the three-dimensional avatar based on the plurality of images captured by the one or more cameras 180. In some implementations, the avatar generation application 340 generates the three-dimensional avatar based on the plurality of images captured by the one or more cameras 180.

Figure 3:
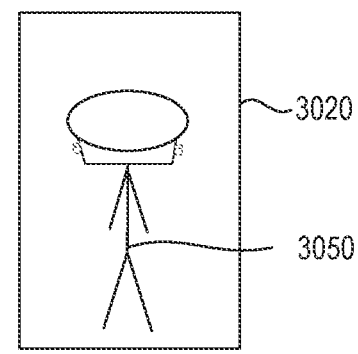
FIG. 3 is an example illustration of a user wearing a virtual reality headset while being positioned in front of a mirror, according to some implementations of the disclosure.
Figure 3:
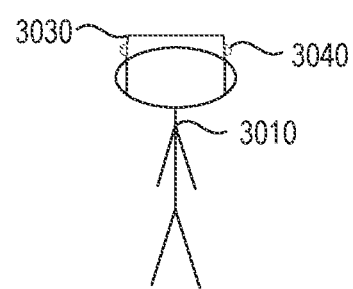

Referring to FIG. 3, an example illustration of a user wearing a virtual reality headset while being positioned in front of a mirror is shown. In FIG. 3 a user 3010 wears a VR headset 3030 (which may correspond to VR headset 100) and is positioned in front of a mirror 3020. A reflection 3050 (mirror image) is shown in the mirror 3020. The VR headset 3030 includes a plurality of cameras 3040 to capture the reflection 3050 of the user 3010 in the mirror 3020 to create or generate a 3D avatar in real-time using at least one of the avatar generation applications 140, 340. While FIG. 3 depicts two cameras 3040, there may be more than two cameras mounted externally to the VR headset 3030 (e.g., four cameras). For example, the mirror 3020 may be a full-length mirror so that an entire body of the user 3010 may be more easily captured by the plurality of cameras 3040.

FIGS. 4A-4D are example illustrations of an example process for capturing images of a reflection of a user in various positions for generating an avatar using a VR headset, according to some implementations of the disclosure. According to one or more examples of the disclosure, a 3D avatar may be generated using a VR headset according to the example process of FIGS. 4A-4D.

Figure 4A:
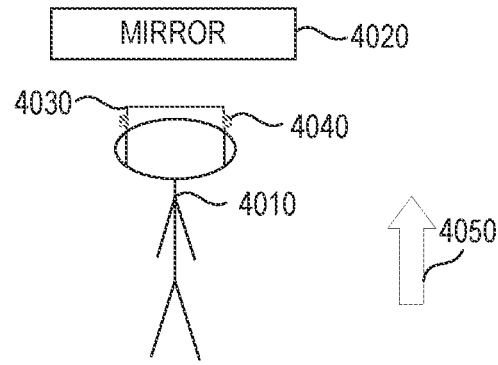
FIGS. 4A-4D are example illustrations of an example process for capturing images of a reflection of a user in various positions for generating an avatar using a virtual reality headset, according to some implementations of the disclosure.

FIG. 4A illustrates a user 4010 standing in front of a mirror 4020 while wearing a VR headset 4030 (which may correspond to VR headset 100) having a plurality of cameras 4040. In FIG. 4A, while the user 4010 is wearing the VR headset 4030 the user 4010 stands in front of the mirror 4020 (e.g., a full-length mirror) and faces in a direction 4050 toward the mirror 4020 such that a reflection (not shown) of the front of the body of the user 4010 is shown in the mirror 4020. In FIG. 4A the reflection of the user 4010 is a frontal view of the user 4010. One or more cameras 4040 included in the VR headset 4030 are configured to capture the reflection of the user 4010 in the mirror 4020 to obtain the front profile of the user 4010 (e.g., from head to toe).

Figure 4B:
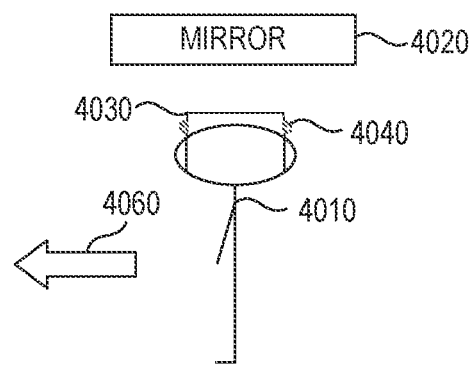

FIG. 4B illustrates another part of a process to generate the 3D avatar in which the user 4010 (while still standing in front of the mirror 4020 and wearing the VR headset 4030) rotates (e.g., 90 degrees from the first position in FIG. 4A to the left to a second position shown in FIG. 4B) such that the body of the user 4010 faces in a first direction 4060 perpendicular to the mirror 4020 and a reflection (not shown) of a second side of the body of the user 4010 (e.g., a second side view) is shown in the mirror 4020. The head of the user 4010 is turned to face the mirror 4020 and one or more cameras 4040 included in the VR headset 4030 are configured to capture the reflection of the second side of the user 4010 in the mirror 4020 to obtain a second side profile of the user 4010.

Figure 4C:
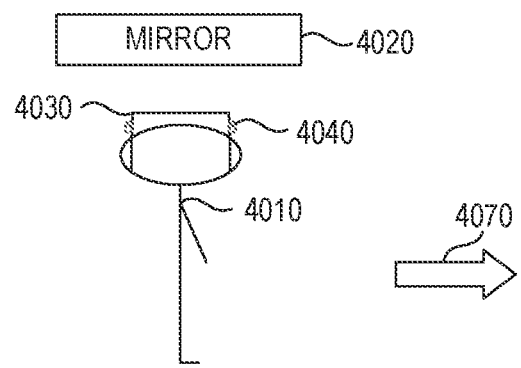

FIG. 4C illustrates a further part of a process to generate the 3D avatar in which the user 4010 (while still standing in front of the mirror 4020 and wearing the VR headset 4030) rotates (e.g., 180 degrees from the position in FIG. 4B to the left or right to the position shown in FIG. 4C) such that the body of the user 4010 faces in a second direction 4070 perpendicular to the mirror 4020 and a reflection (not shown) of a first side of the body of the user 4010 (e.g., a first side view) is shown in the mirror 4020. The head of the user 4010 is turned to face the mirror 4020 and one or more cameras 4040 included in the VR headset 4030 are configured to capture the reflection of the first side of the user 4010 in the mirror 4020 to obtain a first side profile of the user 4010.

Figure 4D:
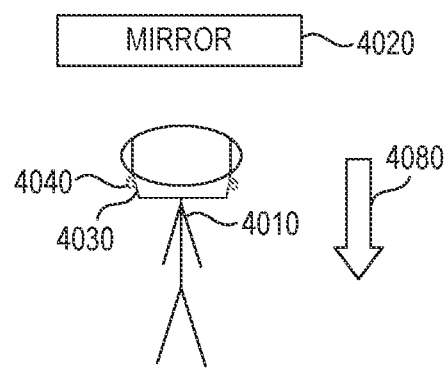

FIG. 4D illustrates another part of a process to generate the 3D avatar in which the user 4010 (while still standing in front of the mirror 4020 and wearing the VR headset 4030) rotates such that the body of the user faces in a direction 4080 opposite of the mirror and a reflection (not shown) of a rear or back side of the body of the user 4010 (e.g., a rear view) is shown in the mirror 4020. In some implementations, one or more cameras 4040 included in the VR headset are capable of facing rearward (e.g., by rotating) or are mounted so as to face in a rearward direction (e.g., direction 4050) and capture the reflection of the rear side of the user 4010 (e.g., in a third position) in the mirror 4020 to obtain a rear profile of the user 4010.

The profile images which are captured via the process shown in FIGS. 4A-4D may be stored in one or more memory devices 120 of the VR headset 100 and/or in one or more memory devices 320 of the server computing system 300. Once all profile images are captured, the images are processed via photogrammetry technology by the one or more processors 110 and/or the one or more processors 310 to generate a full body 3D avatar. The photogrammetry technology, which may be implemented by the VR headset 100, the server computing system 300, or a combination thereof, generates the 3D avatar based on the captured images. The one or more processors 110 and/or the one or more processors 310 may be configured to generate the 3D avatar by processing the captured images (which are 2D images) using an algorithm and stitching the 2D images together. For example, the one or more processors 110 and/or the one or more processors 310 may be configured to obtain depth estimates from the plurality of the 2D images to create a 3D mesh from the 2D images to generate the full body 3D avatar.

The 3D avatar (e.g., full body 3D avatar) generated using the VR headset 100 via the process illustrated in FIGS. 4A-4D can be used in any number of applications like VR games, virtual worlds, metaverse applications, etc. For example, the VR headset 100 may be configured to automatically provide the 3D avatar to VR platforms or VR applications subsequent to generating the 3D avatar (e.g., by the VR headset 100 transmitting the 3D avatar over network 200 to VR platform 332 or VR application 330 or to a VR platform or VR application which may be provided to one or more external computing devices 500). In some implementations, the generated 3D avatar may be presented on the display device 160 of the VR headset 100 (e.g., in a virtual world of a VR application 130 being executed by the VR headset 100) so that the user can view the generated 3D avatar while wearing the VR headset 100.

Although the process of FIGS. 4A-4D illustrates four profiles being captured, in some implementations some of the profiles of the user (e.g., the rear profile and/or one of the side profiles) may not be captured to generate the 3D avatar. For example, a generic rear profile may be utilized for generating the 3D avatar or one of the side profiles may be utilized to generate the other side profile via symmetry. In some implementations, some of the profiles of the user may be captured a plurality of times (e.g., two to four times), for example by repeating one or more of the processes of FIGS. 4A-4D. In some implementations one or more of the repetitions may include the user 4010 having different social expressions (e.g., different emotional expressions such as the user 4010 smiling, the user 4010 making a sad face, the user 4010 being excited, etc.) and/or making different physical expressions (e.g., the user 4010 raising their arms, the user 4010 making various gestures with their hands, the user 4010 kicking their legs, etc.). Repeating the above process with additional profile captures and additional profile captures with the user 4010 having various expressions can ensure that enough samples are provided to generate an avatar that is as lifelike as possible.

Figure 5A:
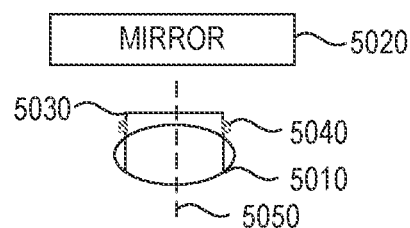
FIGS. 5A-5C are example illustrations of an example process for capturing images of a reflection of a user in various positions for generating an avatar using a virtual reality headset, according to some implementations of the disclosure.
Figure 5B:
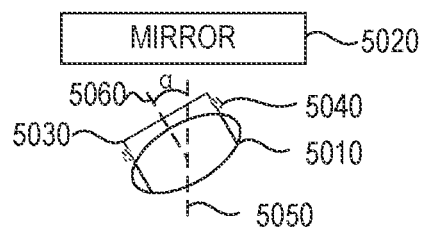
Figure 5C:
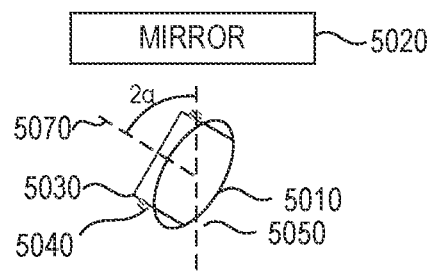

FIGS. 5A-5C are example illustrations of an example process for capturing images of a reflection of a user in various positions for generating an avatar using a VR headset, according to some implementations of the disclosure. According to one or more examples of the disclosure, a 3D avatar may be generated using the VR headset according to the example process of FIGS. 5A-5C.

FIG. 5A illustrates a user 5010 standing in front of a mirror 5020 while wearing a VR headset 5030 (which may correspond to VR headset 100) having a plurality of cameras 5040. In FIG. 5A, while the user 5010 is wearing the virtual reality headset the user 5010 stands in front of the mirror 5020 (e.g., a full-length mirror) and faces in a direction along an axis 5050 that is perpendicular to the mirror 5020 such that a reflection (not shown) of the front of the body of the user 5010 is shown in the mirror 5020. In FIG. 5A the reflection of the user 5010 is a frontal view of the user 5010. One or more cameras 5040 included in the VR headset 5030 are configured to capture the reflection of the user 5010 in the mirror 5020 to obtain the front profile of the user 5010 (e.g., from head to toe).

FIG. 5B illustrates another part of a process to generate the 3D avatar in which the user 5010 (while still standing in front of the mirror 5020 and wearing the VR headset 5030) rotates a predetermined angle α (e.g., 15 degrees to 30 degrees from the position in FIG. 5A to the left to the position shown in FIG. 5B) such that the body of the user 5010 faces in a direction oblique to the mirror 5020 along the axis 5060. A reflection of a first angular side of the body of the user 5010 (e.g., a first angular view) is shown in the mirror 5020 and the head of the user 5010 may be turned to face the mirror 5020 so that one or more cameras 5040 included in the VR headset 5030 can capture the reflection of the first angular side of the user 5010 in the mirror 5020 to obtain a first angular side profile of the user 5010. In some implementations, one or more of the cameras 5040 included in the VR headset 5030 may be mounted at an angle corresponding to the angle by which the user 5010 is to rotate so that the user 5010 need not turn their head to face the mirror 5020. In some implementations, the one or more cameras 5040 included in the VR headset 5030 may be configured to rotate to face the mirror 5020 as the user 5010 rotates to capture the reflection of the first angular side of the user 5010 in the mirror 5020 to obtain the first angular side profile of the user 5010.

FIG. 5C illustrates a further part of a process to generate the 3D avatar in which the user 5010 (while still standing in front of the mirror 5020 and wearing the VR headset 5030) rotates again by the predetermined angle α (e.g., in the same 15 degree to 30 degree increment in the same direction as the prior movement) such that the body of the user 5010 faces in a direction oblique to the mirror 5020 along the axis 5070. A reflection of a second angular side of the body of the user 5010 (e.g., a second angular view) is shown in the mirror 5020 and the head of the user 5010 may be turned to face the mirror 5020 so that one or more cameras 5040 included in the VR headset 5030 can capture the reflection of the second angular side of the user 5010 in the mirror 5020 to obtain a second angular side profile of the user 5010. As mentioned above with respect to FIG. 5B, in some implementations, one or more of the cameras 5040 included in the VR headset 5030 may be mounted at an angle corresponding to the angle by which the user 5010 is to rotate so that the user 5010 need not turn their head to face the mirror 5020. In some implementations, the one or more cameras 5040 included in the VR headset 5030 may be configured to rotate to face the mirror 5020 as the user 5010 rotates to capture the reflection of the first angular side of the user 5010 in the mirror 5020 to obtain the first angular side profile of the user 5010.

Subsequent to the process shown in FIG. 5C, the user 5010 may continue to rotate by the same predetermined angle α (e.g., 15 degree to 30 degree increments in the same direction as the prior movement). One or more of the cameras 5040 are configured to capture additional images of the reflection of the user 5010 in the mirror 5020 at various profiles until the user 5010 has rotated a complete 360 degrees such that images of reflections of the user 5010 are captured from all directions. In some implementations, the one or more cameras 5040 included in the VR headset 5030 may be configured to rotate to face the mirror 5020 as the user 5010 rotates to capture the reflection of the user 5010 in the mirror 5020 to obtain captures of various image profiles of the user 5010. In some implementations, a plurality of cameras 5040 included in the VR headset 5030 are mounted so as to face in different directions so that respective cameras among the plurality of cameras 5040 can capture the reflection of the user 5010 in the mirror 5020 as the user 5010 rotates and various image profiles of the user 5010 can be captured from all directions.

The profile images which are captured via the process shown in FIGS. 5A-5C may be stored in one or more memory devices 120 of the VR headset 100 and/or in one or more memory devices 320 of the server computing system 300. Once all profile images are captured, the images are processed via photogrammetry technology by the one or more processors 110 and/or the one or more processors 310 to generate a full body 3D avatar. The photogrammetry technology, which may be implemented by the VR headset 100, the server computing system 300, or a combination thereof, generates the 3D avatar based on the captured images. For example, the one or more processors 110 and/or the one or more processors 310 may be configured to generate the 3D avatar by processing the captured images (which are 2D images) using an algorithm and stitching the 2D images together. The one or more processors 110 and/or the one or more processors 310 may be configured to obtain depth estimates from the plurality of the 2D images to create a 3D mesh from the 2D images to generate the full body 3D avatar.

The 3D avatar (e.g., full body 3D avatar) generated using the VR headset 100 via the process illustrated in FIGS. 5A-5C can be used in any number of applications like VR games, virtual worlds, metaverse applications, etc. For example, the VR headset 100 may be configured to automatically provide the 3D avatar to VR platforms or VR applications subsequent to generating the 3D avatar (e.g., by the VR headset 100 transmitting the 3D avatar over network 200 to VR platform 332 or VR application 330 or to a VR platform or VR application which may be provided to one or more external computing devices 500). In some implementations, the generated 3D avatar may be presented on the display device 160 of the VR headset 100 (e.g., in a virtual world of a VR application 130 being executed by the VR headset 100) so that the user can view the generated 3D avatar while wearing the VR headset 100.

Although the process of FIGS. 5A-5C illustrates various profiles being captured as the user rotates by a predetermined angle, in some implementations some of the profiles of the user (e.g., the rear profile and/or one of the angular profiles) may not be captured to generate the 3D avatar. For example, a generic rear profile may be utilized for generating the 3D avatar or one of the angular profiles may be utilized to generate a corresponding angular profile via symmetry. In some implementations, some of the profiles of the user may be captured a plurality of times (e.g., two to four times), for example by repeating one or more of the processes of FIGS. 5A-5C. In some implementations one or more of the repetitions may include the user 5010 having different social expressions (e.g., different emotional expressions such as the user 5010 smiling, the user 5010 making a sad face, the user 5010 being excited, etc.) and/or making different physical expressions (e.g., the user 5010 raising their arms, the user 5010 making various gestures with their hands, the user 5010 kicking their legs, etc.). Repeating the above process with additional profile captures and additional profile captures with the user 5010 having various expressions can ensure that enough samples are provided to generate an avatar that is as lifelike as possible.

In addition to the example processes of FIGS. 4A-4D and FIGS. 5A-5C for generating a 3D avatar, other processes and variations of the processes described herein are within the scope of the disclosure. For example, instead of the user rotating by a predetermined angle, the user may rotate in a continuous manner until a full rotation is performed. One or more cameras of the VR headset may capture images of a reflection of the user in the mirror while the user continuously rotates. The process may be repeated as necessary or as desired to obtain additional samples.

Figure 6:
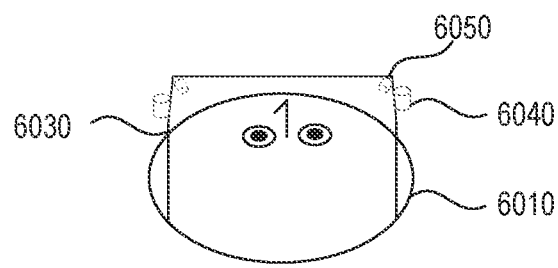
FIGS. 6-8 are example illustrations of virtual reality headsets for generating an avatar, according to some implementations of the disclosure.
Figure 7:
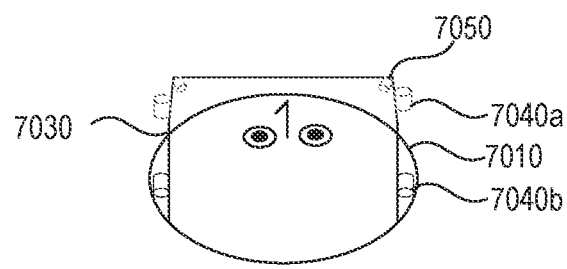
Figure 8:
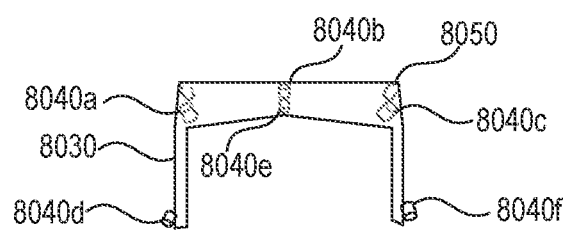

FIGS. 6-8 are example illustrations of virtual reality headsets for generating an avatar, according to some implementations of the disclosure. The example VR headsets of FIGS. 6-8 may correspond to VR headset 100 and any of the example VR headsets of FIGS. 6-8 may be implemented in the example processes described herein, including FIGS. 4A-4D and 5A-5C.

In the example of FIG. 6, the VR headset 6030 includes one or more built-in interior cameras 6050 which are configured to track the eyes of a user 6010 wearing the VR headset 6030. The one or more built-in interior cameras 6050 may also be configured to capture an image of a face of the user 6010. Images of the face of the user 6010 captured by the one or more built-in interior cameras 6050 can be used together with the other images of the reflection of the user 6010 captured by externally mounted cameras 6040 to generate the 3D avatar.

In the example of FIG. 7, the VR headset 7030 includes one or more built-in interior cameras 7050 which are configured to track the eyes of a user 7010 wearing the VR headset 7030 and may also be configured to capture an image of a face of the user 7010. In addition, the VR headset 7030 includes forward facing cameras 7040*a* and rearward facing cameras 7040*b*. Images of the face of the user 7010 captured by the one or more built-in interior cameras 7050 can be used together with the other images of the reflection of the user 7010 captured by externally mounted cameras 7040*a*, 7040*b* to generate the 3D avatar.

In the example of FIG. 8, the VR headset 8030 includes one or more built-in interior cameras 8050 which are configured to track the eyes of a user wearing the VR headset 8030 and may also be configured to capture an image of a face of the user. In addition, the VR headset 8030 includes forward facing cameras 8040*a*, 8040*b*, and 8040*c* and rearward facing cameras 8040*d*, 8040*e*, and 8040*f*. Cameras 8040*a*, 8040*b*, and 8040*c* may be mounted at predetermined angles so that each of cameras 8040*a*, 8040*b*, and 8040*c* face different directions from each other. Similarly, cameras 8040*d*, 8040*e*, and 8040*f* may be mounted at predetermined angles so that each of cameras 8040*d*, 8040*e*, and 8040*f* face different directions from each other. Images of the face of the user captured by the one or more built-in interior cameras 8050 can be used together with the other images of the reflection of the user captured by externally mounted cameras 8040*a*, 8040*b*, 8040*c*, 8040*d*, 8040*e*, and 8040*f* to generate the 3D avatar.

Figure 9:
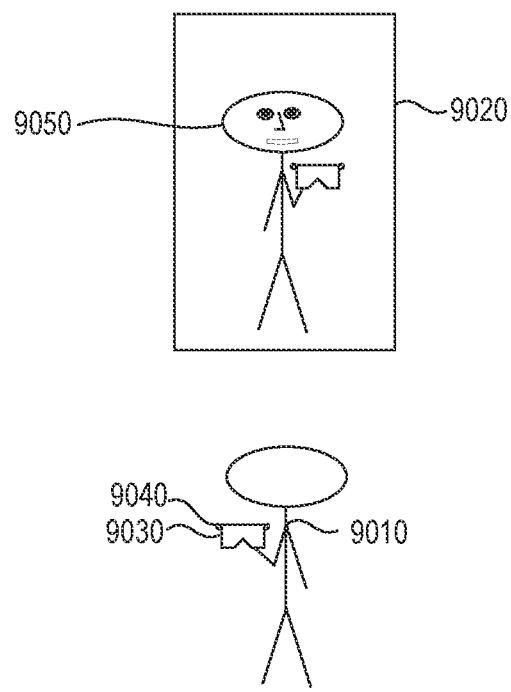
FIG. 9 is an example illustration of an example process for capturing a reflection of a user's facial image for generating an avatar using a virtual reality headset, according to some implementations of the disclosure.

FIG. 9 is an example illustration of an example process for capturing a reflection of a user's facial image for generating an avatar using a virtual reality headset, according to some implementations of the disclosure. In FIG. 9, the user 9010 has removed the VR headset 9030 (which may correspond to VR headset 100) from their head and is standing in front of the mirror 9020. For example, in some implementations, the process for generating a 3D avatar may include the user 9010 removing the VR headset 9030 from their head and holding the VR headset 9030 in a manner so that a reflection 9050 of the user's face can be captured in the mirror 9020. For example, one or more cameras 9040 of the VR headset 9030 may be configured to capture images of the reflection 9050 of the user's face in the mirror 9020 while the VR headset 9030 is held by the user 9010. The images of the reflection of the user's face can be used together with the other images of the reflection of the user obtained by the one or more cameras 9040 of the VR headset 9030 while the user 9010 wears the VR headset 9030 to generate the 3D avatar.

In some implementations, instead of, or in addition to, images of the user's face being captured by the VR headset 100, the avatar generation application 140 (or avatar generation application 340) may include an option for the user to select various facial features such as facial shape, facial hair, an eye shape, eye color, and other attributes from a predefined palette. The avatar generation application 140 (or avatar generation application 340) may include an option for the user to customize other features of the generated 3D avatar such as hair color, hairstyle, clothing, accessories, shoes, and the like. Furthermore, the avatar generation application 140 (or avatar generation application 340) may include an option for the user to adjust the generated 3D avatar's height, build, skin tone, and the like, according to a preference of the user. In some implementations, the method for generating the 3D avatar may include an option for the user to generate a full-body 3D avatar or a partial body 3D avatar (e.g., from the waist up). Features for modifying the 3D avatar may be stored in one or more memory devices 120 of the VR headset 100 and/or may be obtained externally (e.g., from server computing system 300, external content 400, an external computing device 500, etc.).

As described above, the VR headset 100 may include an input device 150 to receive an input (instruction) from a user requesting to generate a 3D avatar. For example, the VR headset 100 may include an application (e.g., VR application 130 and/or avatar generation application 140) in which a user is permitted or enabled to create an avatar, e.g., a 3D avatar.

The VR headset 100 may also include an output device 170 (e.g., a speaker, a display device, a haptic device, a light source, and the like) to provide guidance to the user for generating the 3D avatar. For example, the output device 170 may provide instructions directing the user to change positions so that various profiles of the user can be captured by the one or more cameras 180 of the VR headset 100. For example, the output device 170 may provide instructions via a speaker or by displaying instructions on the display device 160 directing the user to remove the VR headset 100 so that one or more images of the user's face can be captured by the one or more cameras 180 of the VR headset 100. Once the user has taken off the VR headset 100 and positioned the VR headset 100 so that a reflection of the face of the user can be captured by one or more cameras of the VR headset 100, the user can provide an input via input device 150 to indicate the VR headset 100 is in the proper position, and the one or more processors 110 may be configured to control the one or more cameras 180 to capture an image of a reflection of the face of the user in the mirror. In another implementation, the VR headset 100 may be configured to automatically detect that the VR headset 100 is in the proper position (e.g., by facial detection from images captured by the one or more cameras 180), and the one or more processors 110 may be configured to control the one or more cameras 180 to capture an image of a reflection of the face of the user for use in generating the 3D avatar, in response to the facial detection.

The output device 170 may provide various indications to inform, alert, or notify the user to perform a certain action as part of the process for generating the 3D avatar. For example, with respect to FIGS. 4A-4D, after an image is captured of the user when the user in the position shown in FIG. 4A, the user may be directed to turn left by 90 degrees via a message played by a speaker and/or by a visual indication presented on the display device 160. Once the user has turned left by 90 degrees the user can provide an input via input device 150 to indicate the user is in the proper position, and the one or more processors 110 may be configured to control the one or more cameras 180 to capture an image of a reflection of the user in the mirror. In another implementation, the VR headset 100 may be configured to automatically detect that the user is in the proper position (e.g., by one or more sensors such as an accelerometer, gyroscope, etc. included in the VR headset 100), and the one or more processors 110 may be configured to control the one or more cameras 180 to capture an image of a reflection of the user in the mirror, in response to the one or more processors 110 detecting the user is in the proper position. For example, in response to the one or more processors 110 detecting the user is in the proper position, a haptic device may be activated to alert the user that an image of the user is about to be captured by the one or more cameras 180, a message may be displayed on the display device 160, and/or a speaker may play the message.

In another implementation, the one or more cameras 180 of the VR headset 100 may be configured to continuously capture images and the one or more processors 110 may be configured to selectively utilize the captured images of the reflection of the user in the mirror, for example, via machine learning, for generating the 3D avatar. For example, the one or more processors 110, 310 may disregard images which are not reflections of the user.

All or a portion of the examples described herein may be implemented as a computer program product stored on a transitory or non-transitory computer-usable or computer-readable storage medium, such as the memory devices 120, 320, which includes complex programming instructions, such as complex computer-readable program code, to cause the one or more processors 110, 310 to carry out the operations described herein. Thus, the computer-readable program code can include software instructions for implementing the functionality of the examples described herein when executed on the one or more processors 110, 310.

The computer-readable media (e.g., non-transitory computer-readable media) may include, alone or in combination with the programming instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of programming instructions include both machine code, such as produced by a compiler, and files containing higher level code that may be executed by the computer using an interpreter. The programming instructions may be executed by one or more processors (e.g., one or more processors 110 and/or one or more processors 310). The described hardware devices may be configured to act as one or more software modules in order to perform the operations of the above-described examples, or vice versa. In addition, a non-transitory computer-readable storage medium may be distributed among computer systems connected through a network and computer-readable codes or programming instructions may be stored and executed in a decentralized manner. In addition, the non-transitory computer-readable storage media may also be embodied in at least one application specific integrated circuit (ASIC) or Field Programmable Gate Array (FPGA).

While the disclosure has been described with respect to various examples, each example is provided by way of explanation, not limitation of the disclosure. For example, features illustrated or described as part of one example can be used with another example to yield a still further example. Thus, it is intended that the disclosure covers such alterations, variations, and equivalents. Individuals will recognize improvements and modifications to the examples described in this disclosure. All such improvements and modifications are considered within the scope of the concepts disclosed herein and the claims that follow.

What is claimed is:

1. A method, comprising:
   capturing, by at least one camera of a virtual reality (VR) headset, a plurality of images of a reflection of a user in a mirror, wherein the plurality of images include at least:
      a first image of a reflection of the user in a first position with respect to the mirror and a second image of a reflection of the user in a second position with respect to the mirror; and
      an image of a reflection of eyes of the user, wherein the image of the reflection of the eyes of the user is captured while the user is holding the VR headset; and
   generating a three-dimensional avatar based on the plurality of images captured by the at least one camera.

2. The method of claim 1, wherein
   the at least one camera includes at least one rearward-facing camera,
   capturing the plurality of images of the reflection of the user in the mirror includes capturing, by the at least one rearward-facing camera, a third image of a reflection of the user in a third position with respect to the mirror, the reflection of the user in the third position including a reflection of a back of the user, and
   generating the three-dimensional avatar is further based on the third image captured by the at least one rearward-facing camera.

3. The method of claim 1, wherein the three-dimensional avatar is a three-dimensional avatar of an entire body of the user.

4. The method of claim 1, wherein capturing, by the at least one camera, the plurality of images of the reflection of the user in the mirror, further comprises capturing the plurality of images while the VR headset is worn by the user.

5. The method of claim 1, wherein
   the at least one camera includes at least one interior camera configured to capture at least a portion of a face of the user,
   the method further comprises capturing, by the at least one interior camera, at least one image of a face of the user while the VR headset is worn by the user, and
   generating the three-dimensional avatar is further based on the at least one image of the face of the user captured by the at least one interior camera.

6. The method of claim 5, further comprising tracking a gaze of the user using the at least one interior camera.

7. The method of claim 1, wherein
   the first image depicts a frontal view of the user, and
   the second image depicts a side view of the user.

8. The method of claim 1, wherein generating the three-dimensional avatar based on the plurality of images captured by the at least one camera further comprises stitching the plurality of images together.

9. The method of claim 8, wherein stitching the plurality of images together comprises:
   obtaining depth estimates from two or more of the plurality of images; and
   creating a three-dimensional mesh from the plurality of images based on the depth estimates.

10. The method of claim 1, further comprising:
    automatically providing the three-dimensional avatar to a VR platform or a VR application subsequent to generating the three-dimensional avatar; and
    providing, for presentation on a display device of the VR headset, the three-dimensional avatar in a virtual world while the VR application is executed.

11. The method of claim 1, further comprising:
    receiving, via an input device associated with the VR headset, a request to generate the three-dimensional avatar; and
    subsequent to receiving the request, providing guidance to the user using an output device of the VR headset to direct the user to change positions from the first position to the second position after the first image is captured by the at least one camera.

12. The method of claim 11, wherein
    the at least one camera includes at least one rearward-facing camera, and
    the method further comprises:
       after the second image is captured by the at least one camera, providing guidance to the user using the output device to direct the user to change positions from the second position to a third position in which a back of the user faces the mirror;
       after the user is in the third position, causing the at least one rearward-facing camera to capture a third image of a reflection of the user, the reflection of the user in the third position including a reflection of the back of the user; and
       generating the three-dimensional avatar is further based on the third image captured by the at least one rearward-facing camera.

13. The method of claim 1, further comprising:
    providing guidance to the user using an output device of the VR headset to direct the user to take off the VR headset and to hold the VR headset such that the VR headset faces the mirror while the user also faces the mirror.

14. A virtual reality (VR) headset, comprising:
    at least one camera configured to capture a plurality of images of a reflection of a user in a mirror, wherein the plurality of images include at least:
       a first image of a reflection of the user in a first position with respect to the mirror and a second image of a reflection of the user in a second position with respect to the mirror; and
       an image of a reflection of eyes of the user, wherein the image of the reflection of the eyes of the user is captured while the user is holding the VR headset;
    at least one memory configured to store instructions; and
    at least one processor configured to execute the instructions stored in the at least one memory to generate a three-dimensional avatar based on the plurality of images captured by the at least one camera.

15. The VR headset of claim 14, wherein
the at least one camera includes at least one rearward-facing camera,
the at least one rearward-facing camera is configured to capture a third image of a reflection of the user in a third position with respect to the mirror, the reflection of the user in the third position including a reflection of a back of the user, and
the at least one processor is configured to generate the three-dimensional avatar based on the third image captured by the at least one rearward-facing camera.

16. The VR headset of claim 14, wherein
the at least one camera includes at least one interior camera,
the at least one interior camera is configured to capture at least one image of a face of the user while the VR headset is worn by the user, and
the at least one processor is configured to generate the three-dimensional avatar based on the at least one image of the face of the user captured by the at least one interior camera.

17. The VR headset of claim 14, further comprising a display device,
wherein
the at least one processor is configured to automatically provide the three-dimensional avatar to a VR platform or a VR application subsequent to generating the three-dimensional avatar, and
the at least one processor is configured to provide, for presentation on the display device, the three-dimensional avatar in a virtual world while the VR application is executed.

18. The VR headset of claim 14, further comprising:
an input device configured to receive an instruction to generate the three-dimensional avatar; and
an output device configured to, subsequent to receiving the instruction, provide guidance to the user to direct the user to change positions from the first position to the second position after the first image is captured by the at least one camera.

19. A non-transitory computer-readable storage medium that includes executable instructions configured to cause one or more processor devices of a virtual reality (VR) headset to:
capture, by at least one camera of the VR headset, a plurality of images of a reflection of a user in a mirror, wherein the plurality of images include at least:
a first image of a reflection of the user in a first position with respect to the mirror and a second image of a reflection of the user in a second position with respect to the mirror; and
an image of a reflection of eyes of the user, wherein the image of the reflection of the eyes of the user is captured while the user is holding the VR headset; and
generate a three-dimensional avatar based on the plurality of images captured by the at least one camera.

* * * * *